Oct. 29, 1957 W. H. SPURLOCK ET AL 2,810,997

COMESTIBLE HANDLING AND PACKAGING APPARATUS

Filed Oct. 10, 1956 3 Sheets-Sheet 1

INVENTORS
WILLIAM H. SPURLOCK
HARVEY A. EDMONDS
CLIFFORD E. EVANSON
BY
By Kegan and Kegan
ATT'YS.

Oct. 29, 1957 W. H. SPURLOCK ET AL 2,810,997

COMESTIBLE HANDLING AND PACKAGING APPARATUS

Filed Oct. 10, 1956 3 Sheets-Sheet 2

INVENTORS
WILLIAM H. SPURLOCK
HARVEY A. EDMONDS
BY CLIFFORD E. EVANSON
By Kegan and Kegan
ATT'YS.

INVENTORS
WILLIAM H. SPURLOCK
HARVEY A. EDMONDS
BY CLIFFORD E. EVANSON
By Kegan and Kegan
ATT'YS.

United States Patent Office 2,810,997

Patented Oct. 29, 1957

2,810,997

COMESTIBLE HANDLING AND PACKAGING APPARATUS

William H. Spurlock, Harvey A. Edmonds, and Clifford E. Evanson, Chicago, Ill., assignors to Leaf Brands, Inc., Chicago, Ill., a corporation of Illinois Application October 10, 1956, Serial No. 615,035

17 Claims. (Cl. 53—159)

This invention relates to apparatus for handling and packaging comestibles, and more particularly it relates to transfer, alignment and packaging apparatus for light frangible comestibles such as sugar wafers.

With apparatus having the general arrangement as herein set forth, in the art it is readily known that only a relatively slight misalignment of the comestibles, as they are carried from their forming apparatus towards final packaging, causes much resultant jumbling, turning and crowding during the several transfer operations. Experience has shown that the hand labor needed to straighten out the comestibles necessitates not only much undesirable comestible handling, but also that the apparatus shut down during such period approximates a considerable amount of the total time the apparatus should be in operation. The loss in both time and money is therefore quite evident.

Moreover, known machines for handling comestibles often require elaborate equipment to maintain the comestibles in condition for packaging, and often are responsible for much breakage during the transferring and packaging of frangibles, such as sugar wafers. Also, more often than not, known packaging equipment is unable to keep pace with comestible feed thereto; and, consequently either the comestible feed must be made intermittent to allow the packaging operation to catch up, or must be appreciably slowed down.

In contrast, the present invention contemplates a system of conveyors and alignment apparatus which delivers comestibles in a single straight line to packaging equipment, without excessive handling of, or work on, the comestibles, with the packaging equipment being of such novel arrangement and design as to rapidly and efficiently package the comestibles without a slow down of comestible feed, or undue breakage. More specifically, the invention provides a first conveyor for delivering irregularly aligned squads or rows of comestibles arranged transverse to the direction of comestible travel, apparatus for accurately aligning the rows of comestibles on said conveyor transverse to the travel thereof, means for adequately spacing the successive rows, a second conveyor running transverse to said first conveyor and adapted to receive the aligned comestibles fed thereto and deliver them in continuous single row alignment to a packaging station, and apparatus at said station adapted to receive the aligned comestibles, move them transverse to their direction of alignment on said second conveyor, and deliver them alternately to either of two packaging positions, or, if the choice may be, to only one of the packaging positions.

Accordingly, it is an object of this invention to provide apparatus to overcome the aforementioned and other known failings of apparatus for handling and packaging frangible comestibles.

A principal object of this invention is to provide conveyor, handling, alignment, and packaging apparatus for delicately constituted comestibles, said apparatus being capable of reducing the hazard of loss due to breakage to a minimum while accomplishing the several operations in a highly efficient manner.

Another object of this invention is to provide a system of conveyors for properly spacing rows of comestibles carried thereon, apparatus being arranged with said conveyors for aligning the comestibles thereon in lines substantially transverse to the travel thereof, said comestibles being thus in proper position and condition to be transferred to another conveyor moving in a direction of travel substantially parallel with the rows of comestibles.

More specifically, it is an object of this invention to provide alignment apparatus in juxtaposition with said system of conveyors, having a stop bar selectively positionable into the path of comestible travel, and a photoelectric device, responsive to the irregularity of comestible alignment, arranged to actuate said stop bar to intercept comestible travel until all comestibles in an irregular line are realigned, and thereafter to deactuate said stop bar to allow travel of the aligned row of comestibles towards final packaging.

Another object of this invention is to provide a novel system of guides for maintaining the comestibles properly aligned during their travel towards the packaging station.

Still another object of this invention is to provide a novel control means at said packaging station for sensing the comestibles fed thereto, and to thereafter actuate the packaging apparatus for removal of the comestibles to awaiting packages.

A feature of this invention is to provide packaging equipment adapted to receive the aligned comestibles, sweep them into awaiting packages, and further bar other comestible feed thereto until the packaging sequence is completed.

A further feature of this invention is to provide packaging equipment capable of handling extremely large quantities of comestibles within a relatively short period of time, said equipment including a sweeper assembly and means for actuating said assembly alternately to either of two packaging positions, thereby appreciably increasing the rate of packaging by not requiring the sweeper assembly to return to a home or neutral position after each packaging operation.

Specifically, it is an object of this invention to provide apparatus capable of aligning comestibles on a moving conveyor, into rows thereof, spacing said rows of comestibles to allow proper delivery thereof to a conveyor moving substantially parallel to said rows, said latter conveyor being capable of delivering the comestibles to a packaging station and having means for maintaining the comestibles grouped in a continuous single line, said station having means for sensing the presence of the comestibles fed thereto, means for selectively barring comestible feed, a sweeper for delivering the aligned comestibles to awaiting packages, and means for sequentially controlling sweeper actuation to either of alternate packaging positions and thereafter allowing further comestible feed to said station.

And, another object of this invention is to provide comestible handling and packaging equipment which is of simple rugged construction, dependable in operation, which does not upset the comestibles from their desired alignment, and which does not damage comestibles as fragile as sugar wafers, even though operated at high speed.

The foregoing and other objects, advantages and features of construction will become more apparent from a consideration of the following description and the appended drawings.

In the drawings:

Figure 1 is an overall plan view of the subject invention;

Figure 1*a* is a perspective view of one form of comestible, namely, a sugar wafer, which the invention was designed to handle and package;

While like problems are present in varying degrees in the handling and packaging of all frangible comestibles, such as candy bars, crackers and cookies, in view of the immediate commercial demand therefor, the embodiments of the herein invention are especially suited for use in handling and packaging sugar wafers. Such articles are generally very light and extremely fragile, and thus present a variety of problems during their handling and packaging operations.

In the manufacture and packaging of sugar wafers, the general process is to form them from bulk and deliver them in rows or squads on an endless conveyor which passes them through enrobing machinery to cover them with a coating, such as chocolate. Thereafter, the comestibles are transferred to another endless conveyor which carries them through a refrigeration compartment to harden the coating. This second conveyor generally has an oilcloth or other plastic face to which the coating will not stick as it hardens. From the second conveyor the wafers are transferred to a third conveyor which accumulates them and delivers them to a packaging station. Desirably, packaging should be accomplished with the wafers in neat, uniform aligned rows.

Because, however, of their generally small base and light weight, the wafers, more often than not, become jumbled and bunched up during the several processes and transfer operations they experience and thus are not in condition for packaging without added operations to upright and align them. Such operations require added machinery or, as is more usual, manual operations to accomplish the desired results. Much of the manual operations, require complete machine shut down before the wafers are properly aligned. This is especially true when the wafers tend to bunch up or become jumbled during the several transfer operations they undergo.

Figures 1, 1A, 2, 3:
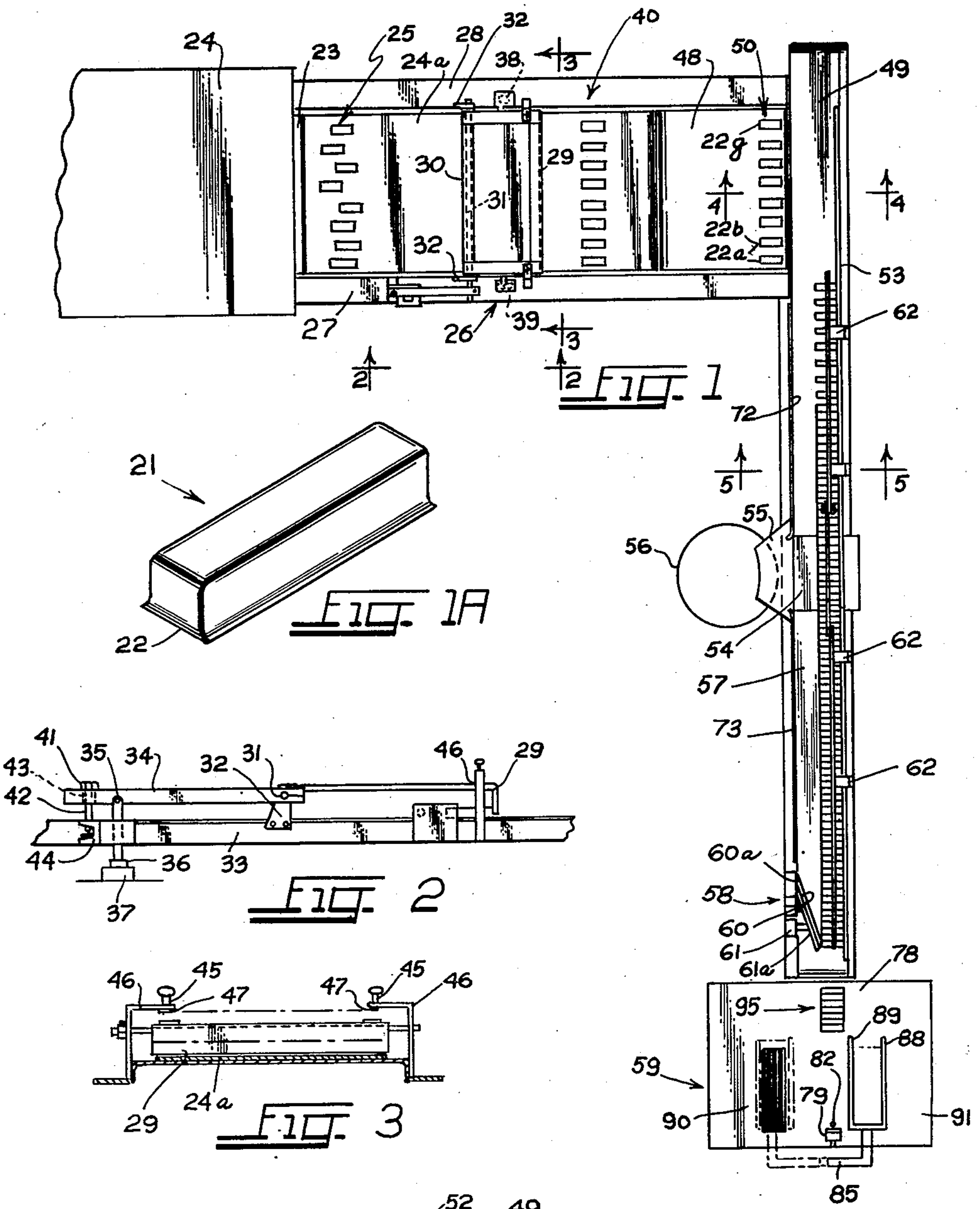
Figure 2 is a view taken on line 2—2 in Figure 1.
Figure 3 is a cross-sectional view taken on line 3—3 in Figure 1.

Referring to Figure 1*a*; the comestible to be packaged comprises a bar 21 approximately one-half inch square in cross section and two and one quarter inches in length. The base 22 of the coated bar is slightly enlarged due to the fact that the coating, when soft, tends to run down the bar sides. To maintain the aesthetic appearance of the package containing such wafers, it is highly desirable to maintain all wafers on their bases for uniformity.

The wafers are cut from bulk by a cutter (not shown) and thereafter delivered in rows to a conveyor which carries them through enrober apparatus (also not shown) which applies the desired coating. Thereafter, the coated wafers are delivered to a belt conveyor 23, seen in Figure 1, which carries them through refrigeration tunnel 24 to harden the coating. The surface of conveyor 23 generally is made of oilcloth, or similar material, and to which the coated wafers will not stick as they harden. At the end of the flight of conveyor 23 the wafers are transferred to an adjacent conveyor 24*a* which carries them in the same direction.

All the aforementioned operations on the originally aligned wafers, namely, the forming and enrobing operations, and, of course, the transfers from one conveyor to another, tend to pull the wafers out of line until they appear as indicated generally at 25. It is necessary, for reasons that will be made clear hereinafter, to again align the wafers in rows.

For the purpose of realigning the wafers in rows extending generally perpendicular to the path of wafer travel, aligning apparatus 26, shown in Figures 1 to 3, is provided. The aligning apparatus 26, which is supported from platforms 27, 28, extending along each side of conveyor 24 and positioned slightly therebelow, includes an alignment arm 29, extending transverse to the travel of conveyor 24 and depending from a rectangular shaped frame 30. The rear leg of frame 30 is keyed to a shaft 31 rotatably mounted in end brackets 32—32 held on sidewalls 33—33 extending from the platforms 27, 28.

A bar 34, also is keyed to one end of shaft 31 adjacent one end thereof, extends rearwardly, and a downwardly extending rod 35 is pivotally connected to bar 34. At its lower end rod 35 is connected to the spring biased plunger 36 of a solenoid 37 mounted on platform 27. Operation of solenoid 37 is controlled by a photo-electric cell assembly which includes a light source 38 and a photo-cell 39. The photo-electric cell assembly is of the standard, well known variety, and, hence, it need not be described in detail; since those skilled in the art will understand that such an assembly may act as a switch to control any electric circuitry to which it is connected.

According to the present invention the solenoid 37 is normally de-energized and its plunger 36 is held in a retracted position. As the nonaligned wafers on conveyor 24 break the beam from light source 38 to photo-cell 39, however, the necessary electrical circuitry is completed to energize solenoid 37. Thereupon rod 35 is urged upwardly by solenoid plunger 36, causing shaft 31 to rotate clockwise, as seen in Figure 2, and positioning arm 29 in the path of the wafers which are thereby intercepted in their travel on the conveyor. The conveyor 24, in the meanwhile, continues to slide under the intercepted wafers. Once all the wafers of a nonaligned group, such as that shown at 25 pass the photo electric assembly, and the light beam becomes uninterrupted, the electrical circuitry to solenoid 37 becomes broken, and the action of its spring biased plunger returning to a retracted position correspondingly causes shaft 31 to rotate counterclockwise to left arm 29 from the path of the wafers. The aligned wafers, such as those generally indicated at 40, thereupon are permitted to travel once again with conveyor 24. The action of arm 29 furthermore properly spaces the successively aligned rows of wafers for better product delivery towards the packaging station.

To limit the travel of alignment arm 29 downwardly, a stop 41, engageable with the upper surface of bar 34 to control the travel thereof, is provided. Stop 41 is mounted on a bolt 42 extending through an opening 43 in bar 34, and bolt 42 is threadably adjustable in a bracket 44 mounted on sidewall 33. Adjustable positioning of stop 41 is accomplished by threading bolt 42 into or out of bracket 44 as desired. Similarly, the upward positioning of alignment arm 29 is controlled by a pair of stops 45, 45, each threadably carried in a respective bracket 46 mounted to one of the sidewalls 33. Pads 47, 47, are positioned on the upper surface of rectangular frame 30 to engage the stops 45, 45.

The aligned wafers are next transferred to a speed-up or acceleration conveyor 48 which carries them to an accumulating conveyor 49 running at right angle to the conveyors 24 and 48. The purpose of acceleration conveyor 48 is two-fold. First, as is apparent in Figure 1, wafer 22*g*, after being delivered to accumulating conveyor 49, must clear the entire width of conveyor 48 (or conveyor 24) before the next row of aligned wafers is delivered to accumulating conveyor 49. If this is not done, jamming and turning of the wafers occurs on conveyor 49.

Two alternatives were present to obviate this problem. The first alternative was to extend conveyor 24 to conveyor 49, and greatly speed up the travel of conveyor 49 to move the wafers delivered thereto from the area of conveyor 24 at an accelerated rate. Experimentation, however, showed that the wafers tended to skew about as they hit the fast traveling conveyor and thus become misaligned, or even to be thrown from a rest position on their respective bases 22. Also, even the new packaging equipment, described hereinafter, towards which the wafers were to be delivered by conveyor 49, was not fast enough to handle the accelerated feed of the wafers. The second alternative, as herein described, was to add acceleration conveyor 48, which accelerates a row of wafers, such as that generally indicated at 50, thus increasing the distance between the rows 40, 50, and allowing all the wafers delivered to accumulating conveyor 49 to clear conveyor 48. The second purpose of accelerating conveyor 48 is to impart a greater inertia or force to the wafers, assuring that they will be properly delivered to accumulating conveyor 49.

Figure 4:
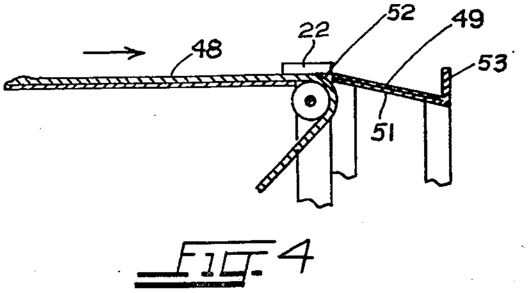
Figure 4 is a cross-sectional view taken on line 4—4 in Figure 1.

As seen in Figure 4, in the area where the wafers are transferred from accelerating conveyor 48 to accumulating conveyor 49, the latter conveyor travels over a surface 51 which tilts it downwardly and away from conveyor 48. The fast moving wafers thus shoot over the gap 52 between the two conveyors, strike a guide wall 53, spend their inertia which enabled them to accomplish the transfer, and fall dead on conveyor 49 to travel therewith.

In practice, alignment arm 29 may be positioned at an angle slightly from the perpendicular to the travel of conveyor 24, whereby wafer 22*a* is positioned slightly in front of wafer 22*b*, and so on down the row. Thus, wafer 22*a* reaches conveyor 49 slightly before the wafer adjacent thereto does, and so on down the row until wafer 22*g* is the last to reach conveyor 49. As distinguished from misaligned rows, this arrangement delivers the wafers to conveyor 49 in related order and any slight skewing of adjacent wafers which may occur as they hit conveyor 49 will not affect adjacent wafers. Also, the light beam extending between light source 38 and photo-cell 39 correspondingly may be directed parallel to the inclination of alignment arm 29.

The arrangement of the present invention has the general advantage that there is assurance that all wafers gathered on accumulating conveyor 49 for delivery to the hereinafter described packaging apparatus will be properly positioned for packaging without necessitating any further operations on the wafers. In contrast, when using only a single conveyor, such as conveyor 24, to deliver the wafers to accumulating conveyor 49, or when delivering the wafers thereto in misaligned condition, the wafers became jumbled, bunched up and seated in many different positions, necessitating continuous supervision and much hand labor to gather them in the correct position in readiness for ultimate packaging. The present invention, however, aligns the wafers whereby those in each row or group are delivered in substantial unison to conveyor 49. Being aligned and delivered in substantial unison, the wafers do not interfere with each other during the transfer operation between conveyors 48, 49, but rather tend to aid their alignment; since, as they travel on conveyor 49, they ultimately abut and straighten out possibly slightly skewed adjacent wafers to form an uninterrupted and evenly oriented line of wafers, as best seen in Figure 1. The importance of this line is manifest; since the wafers therein are correctly positioned for packaging and need only be swept perpendicularly from the line into waiting boxes, as hereinafter described.

The wafers are carried by conveyor 49 to an inspection or dead plate 54 where an operator can inspect them for quality as they pass thereover. Any rejects may be discarded down chute 55 and into a collecting bin 56. The pressure of the back wafers on conveyor 49 pushes the wafers over dead plate 54 and onto an aligned accumulating conveyor 57 which carries them past a brake assembly 58 adapted to stop the wafers while conveyor 57 continues to travel thereunder; since, it is necessary, for reasons that will be more clear hereinafter to hold back the flow of wafers from the packaging equipment, indicated generally at 59. The brake assembly 58 includes a brake arm 60, pivoted at 60*a*, and adapted to engage the wafers on conveyor 57 to stop their flow therewith. A solenoid 61, having a spring biased plunger which is attached to a lever 61*a* connected to brake arm 60, controls the positioning thereof. Solenoid 61 in its energized condition counteracts its spring biased plunger to maintain brake arm 60 de-actuated. De-energization of the solenoid allows its plunger to actuate arm 60, and as is apparent from Figure 1, this causes the wafers to bunch up in uninterrupted fashion as the conveyors 49, 57, continue to run.

Because the operation of brake arm 60 causes a back pressure along the line of wafers, the moving conveyors 49, 57, ordinarily would tend to upset the wafers and cause them to turn, tumble and climb over each other. The herein described invention, however, contemplates a sytem of guides which maintain the wafers in proper position even when brake arm 60 is actuated.

Figure 5:
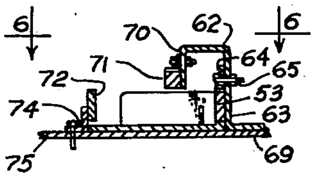
Figure 5 is a cross-sectional view taken on line 5—5 in Figure 1.
Figure 6:
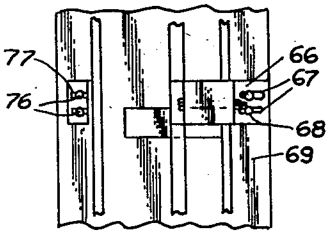
Figure 6 is a view taken on line 6—6 in Figure 5.

Referring to Figures 1, 5, and 6, it is seen that wall 53 extends along conveyor 49, across dead plate 54, to adjacent the end of conveyor 57, and thereby provides a guide which prevents the wafers from moving laterally of the conveyors. The guide wall 53 is supported by a series of spaced substantially U-shaped brackets 62. A typical mounting has wall 53 being secured to one leg 63 of a bracket 62 by conventional means, such as bolts 64 and nuts 65. Integral with bracket leg 63 is a laterally extending arm 66 having slots 67 therein through which bolts 68 pass for adjustable attachment to a support surface 69. The other leg 70 of each bracket 62 carries an overhead guide rail 71 which is adjustably positioned slightly above the wafers. The wafers are able of passing under the overhead rail 71 without touching it. However, if the wafers tend to tumble or climb over each other, rail 71 prevents such action, thereby assuring that each wafer is properly seated on its base portion 22.

A second guide rail 72 is provided adjacent the other side of conveyor 49 starting adjacent conveyor 48 and ending in the area of the dead plate 54 to allow the operator free access to bin 56. An aligned guide wall 73 extends from dead plate 54 along conveyor 57 to brake arm 60 to prevent wafers from falling from the conveyor. Each of the guide rails 72, 73, is supported in L-shaped brackets 74 adjustably mounted to support surface 75 by bolts 76 which pass through bracket slots 77. In the area of brake assembly 58, if it happens that any wafers are slightly out of line, the brake arm 60 in its de-actuated position acts as a cam surface to urge the wafers into realignment as they pass thereby.

De-actuation of brake arm 60 allows the wafers to pass onto table 78 immediately adjacent the end of flight of conveyor 57. Back pressure of wafers carried on conveyor 57 pushes the wafers on table 78 forward until the leadingmost wafer comes into contact with a stop bar 79. Positioned slightly before bar 79 and thereabove is an air nozzle 80, through which compressed air is directed from a pipe 81. The air jet is directed downward where it enters an opening 82 directly below nozzle 80 and before stop bar 79. A pipe 83 interconnects opening 82 with an air switch 84. As the foremost wafer contacts stop bar 79 it interrupts the air jet to opening 82, thereby setting the packaging apparatus into operation, as explained hereinafter.

Rearward of table 78 but adjacent thereto, there is provided an upwardly diverted lever 85, pivotally connected at its lower end to framework (not shown). At its upper end, there is mounted on lever 85 a forwardly projecting member 86 which carries a transverse bar 87 above table 78. Extending forwardly from bar 87 are a pair of spaced sweeper arms 88, 89, which depend to slightly above table 78, and hence are adapted to sweep the wafers therefrom. Pivoting of lever 85 to the left, as viewed in Figure 1, brings sweeper arm 89 into contact with the wafers, while pivoting of the lever 85 to the right, from its position shown in phantom lines in Figure 1, brings sweeper arm 88 into contact with the wafers. Thus, movement of the sweeper arms alternatively moves a group of wafers from table 78 to a first packaging station 90, then moves the next group of wafers to a second packaging station 91.

Figures 10, 11, 12, 13:
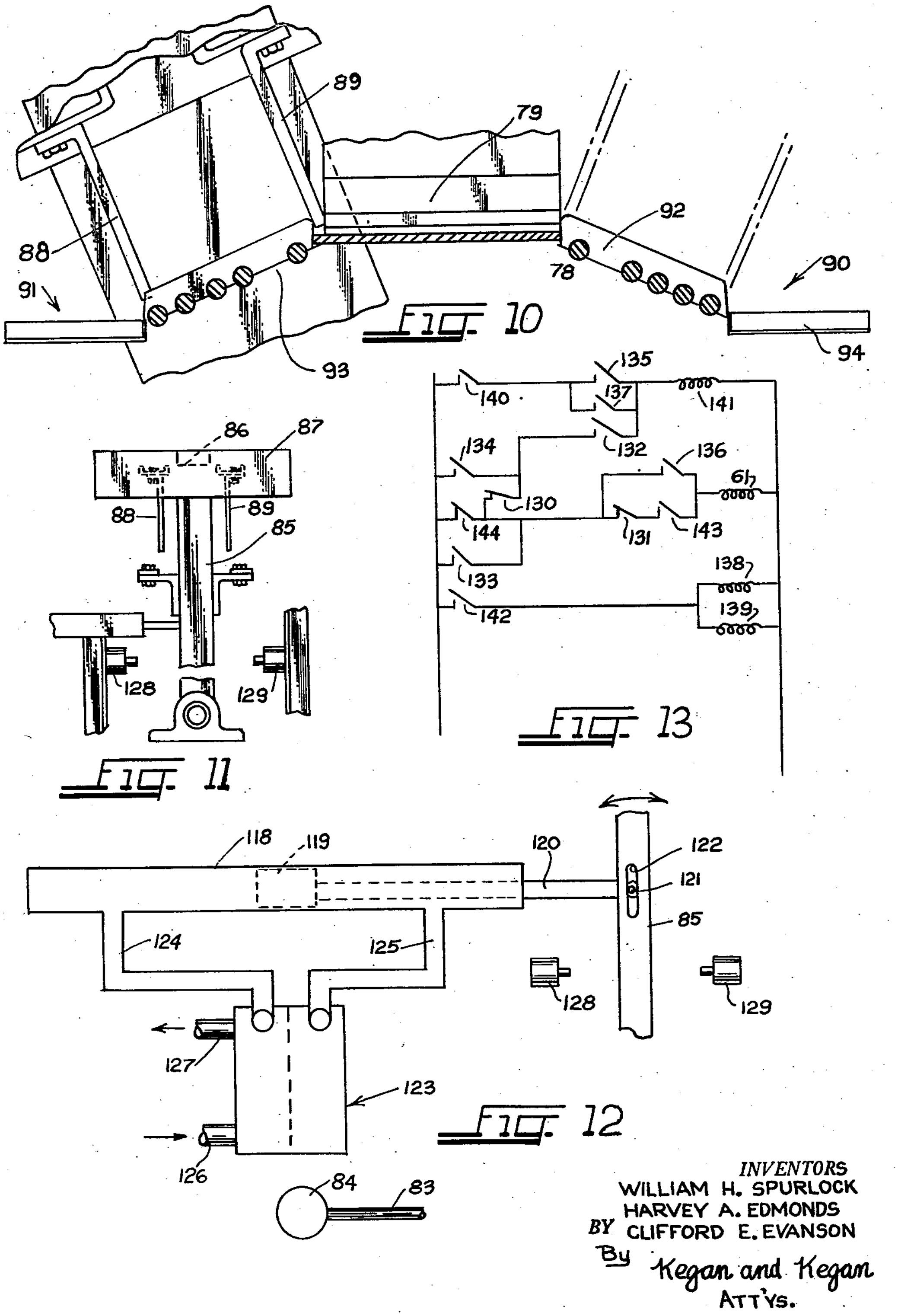
Figure 10 is a front cross-sectional elevation view of the packaging station, looking in the direction of the sweeper assembly.
Figure 11 is a rear elevation view of the sweeper assembly looking in a direction opposed to wafer travel thereat.
Figure 12 is a diagram of the pneumatic equipment and connections for operating the sweeper assembly.
Figure 13 is a circuit diagram showing in a schematic way a preferred form of circuits for operating the herein disclosed apparatus in accordance with this invention.

As seen in Figure 10, the sweeper arms are adapted to sweep an arc and to move the wafers down either roller ramp 92 or roller ramp 93, depending upon the direction of movement of lever 85. In Figure 10 arm 88, as it moves to the right, is in readiness to sweep wafers from table 78 and down roller ramp 92 and into a box 94 to which the ramp leads. The sweeper arms 88, 89, of course, are of such length as to sweep from table 78 the required number of wafers to fill the boxes. As seen in Figure 1, this leaves a few wafers, such as those indicated at 95, on table 78 after each packaging or sweeping action. These wafers therefore become part of the next group to be packaged, once brake arm 60 is de-actuated to allow further wafer feed onto table 78.

Figure 8:
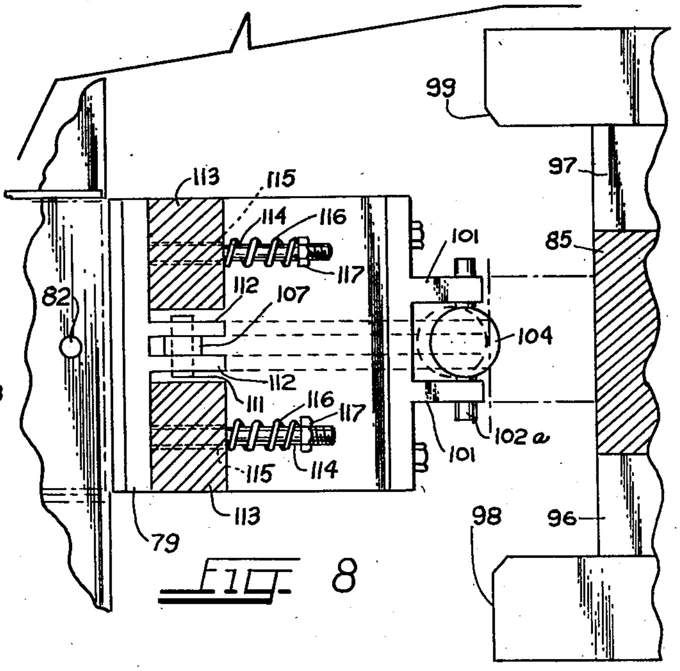
Figure 8 is a view taken on line 8—8 in Figure 7.
Figures 7, 9:
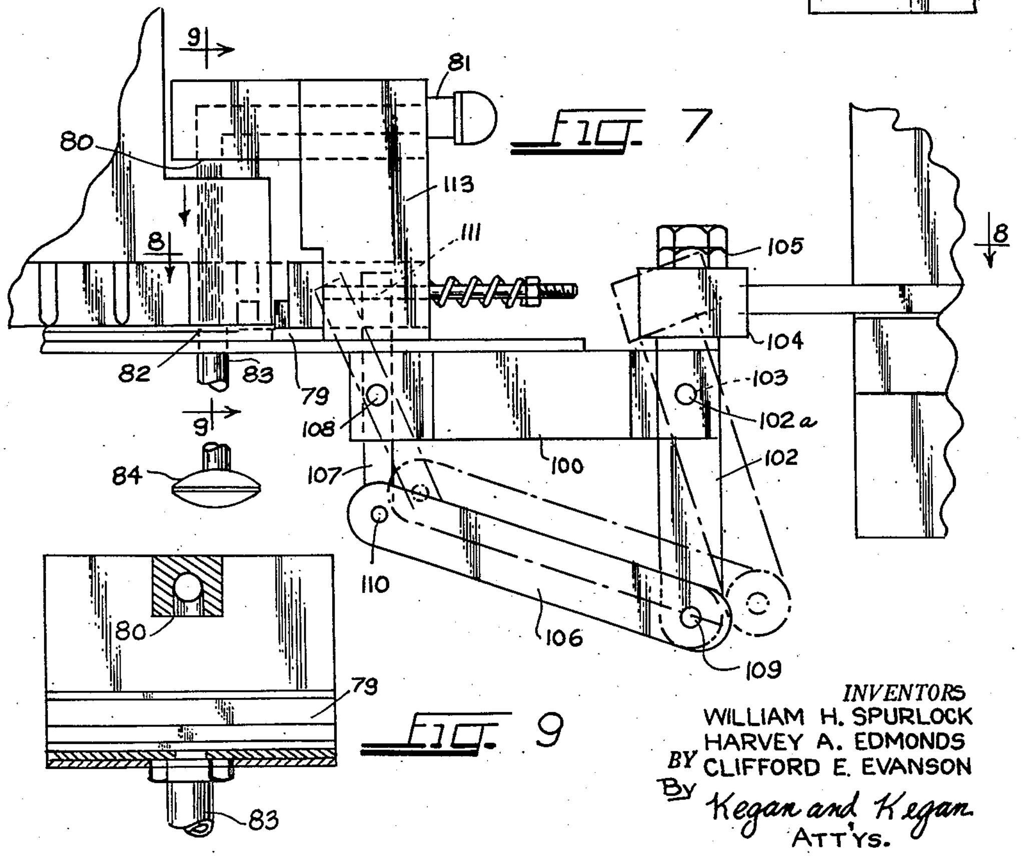
Figure 7 is a side elevation view at the packaging station, showing the sensing apparatus, and linkage for relieving pressure on the wafers fed thereto, said linkage being shown in alternate positions.
Figure 9 is a view taken on line 9—9 in Figure 7.

Referring to Figures 7 and 8, at approximately the level of table 78, lever 85 carries laterally and oppositely projecting pieces 96, 97, which respectively carry cam surfaces 98, 99. Fixed to table 78 and directed rearwardly therefrom is a shelf 100 having lugs 101—101 having a shaft 102*a* extending therebetween. A vertically standing rod 102, pivotally mounted on shaft 102 at 103, carries at its upper end a roller 104 alternately engageable with cam surfaces 98, 99. A nut 105 holds roller 104 on rod 102. At its lower end rod 102 is connected by a link 106 to the lower end of another rod 107 which at 108 is pivotally mounted to shelf 100. As is apparent from Figure 8, the respective pivotal connections at 109, 110, of link 106 to rods 102, 107, are not fixed. At its upper end rod 107 is pivotally joined to a shaft 111 held between lugs 112—112 fixed to the rear of stop bar 79 and located between pillars 113—113 holding air nozzle 80.

A pair of horizontally extending shafts 114—114 are also mounted to the rear of stop bar 79, extending through openings 115—115 in pillars 113—113. Compression springs 116—116, each mounted on a respective shaft 114 and anchored between a pillor 113 and a nut 117 threaded on the respective shaft 114, tend to urge stop bar 79 into a retracted position against the pillars 113—113.

When lever 85 is at either of its alternate rest positions, roller 104 is engaged by one of the cam surfaces 98, 99, which push it forward slightly, thereby actuating the aforedescribed linkage and holding stop bar 79 at a projected position away from the pillars, as indicated by the phantom lines in Figures 7 and 8. This is the position held by stop bar 79 after brake bar 60 is de-actuated and the wafers are fed towards it. After the air jet is interrupted by the wafer which comes into contact with stop bar 79, the cam surface 98 or 99 engaging roller 104 moves from contact therewith, thereby allowing the compression springs 116—116 to pull stop bar towards the pillars 113—113. This leaves a slight space between stop bar 79 and the leading wafer of the group about to be swept into a box. Thus, the back pressure caused by the moving conveyor 57 on the wafers between the brake assembly 58 and stop bar 79 is relieved, and the wafers on table 78 may be swept into the waiting boxes and packaged without fear of upsetting them during the packaging operation.

The retraction of stop bar 79, of course, occurs immediately prior to sweeper arm 88 or 89 contacting the wafers and packaging them in a box. At the end of the packaging operation, the other of the cam surfaces, 98 or 99, contacts roller 104 to position stop bar 79 away from pillars 113—113 and in readiness for the next group of wafers to be fed thereto. The packaging operation is repeated, with alternate feeding of the successive groups of wafers to packaging positions 90, 91, by the sweeper arms 88, 89.

Operation of the sweeper arms may be effected through any of the well known electrical, mechanical, or pneumatic drive means, or combinations thereof. In the preferred embodiment of the invention, movement of lever 85 is accomplished by selective operation of an air cylinder 118, the plunger 119 of which carries a rod 120 which is connected to a pin 121 held in a slot 122 in lever 85. Operation of air cylinder 118 is controlled by a four-way solenoid valve 123 which is connected thereto by lines 124, 125. Also, a line 126 from a pressure source (not shown) leads into valve 123, while leading therefrom is an exhaust line 127. Energization of solenoid valve 123 is accomplished by air switch 84, as hereinafter explained, while limit switches 128, 129, positioned on opposite sides of lever 85, to be engageable therewith, determine the sequence of apparatus operation.

Four-way solenoid valve 123 is of the well known variety commonly used to operate double-acting air cylinders, such as the solenoid valve manufactured by the Skinner Electric Valve Division of the Skinner Chuck Company of New Britain, Connecticut, and known in the trade as Model V9 Series. Two solenoids are provided in the valve to control pressure distribution, and they are so arranged that the cylinder piston 119 is positioned to the left, in reference to Figures 1, 12 and 13, with pressure when both valve solenoids are de-energized. Thus, with the valve solenoids both de-energized, the sweeper arms 88, 89, are located at packaging position 91, as indicated by the solid lines of Figure 10. The solenoid valves, of course, operate simultaneously, being energized or de-energized together.

Pressure switch 84 also is of the well known variety of low pressure switches commonly used as a switching control. The herein employed switch is of the type manufactured by the Diaphlex Division of Cook Electric Company, Chicago, Illinois, and known as Model No. 555-903. An actuating bellows, responsive to pressure changes, is provided within the switch casing to open and close an electrical switching component. As herein employed, the electrical switching component of pressure switch 84 is maintained open by the air jet from nozzle 80 through opening 82. Interruption of the air flow to opening 80, however, is immediately sensed by pressure switch 84 which thereupon closes its electrical switching component to initiate the packaging operation.

The apparatus is adapted to package the wafers at the packaging stations 90, 91, as hereinbefore described, or it is adapted to package wafers at only station 90. If the latter operation is employed, the sweeper arms move from packaging station 91, sweep the wafers from table 78 and to packaging station 90, and thereafter immediately return to packaging station 91 in readiness for the next group of wafers to be moved to station 90. A double pole double throw selector switch is provided to select either dual packaging station or single packaging station operation.

Referring to Figure 13, it is seen that the selector switch controls four contacts, 130, 131, 132, and 133 which are ganged so that closing of the former two contacts, opens the latter two, and vice versa. When contacts 130 and 131 are closed, the apparatus is set for dual packaging, while opening of contacts 130, 131, and closing of contacts 132, 133 sets the apparatus for single station packaging operation. Also, the limit switches 128, 129, each control two contacts. Switch 128 when engaged by the side of lever 85 closes contacts 134, 135, while switch 129, when engaged by the lever, closes contacts 136, 137. The two solenoids of valve 123, are indicated in Figure 13 as 138, 139.

Operation for dual packaging station operation is as follows. Contacts 130 and 131 are closed by the selector switch, and, with lever 85 and the sweep arms 88, 89, resting at station 91, limit switch 129 is closed to close contacts 136, 137. As pressure switch 84 senses the interruption of the air jet from nozzle 80, it closes its electrical contact 140. This energizes ratchet relay 141, which controls contacts 142, 143, and 144. Being a ratchet type relay, the contacts remain in their actuated position until the next relay energization. In the instant case, energization of relay 141 closes contacts 142 and 143, while opening contact 144. Opening of contact 144 de-energizes solenoid 61 which allows its spring biased plunger to actuate brake arm 60 and stop the flow of wafers on conveyor 57.

In the meanwhile, closing of contact 142 energizes valve solenoids 138, 139, reversing the pressure to air cylinder 118, moving its plunger to the left as seen in Figures 1, 11, and 12, and moving sweeper arm 88 into contact with the wafers on table 78. Movement of lever away from limit switch 129 opens contacts 136, 137. Once arm 88 clears the wafers table 78, the air jet from nozzle 80 again is uninterrupted and contact 140 also opens. As sweeper arm 88 delivers the wafers to packaging station 90, lever 85 engages limit switch 128, thereby closing contacts 134, 135. With contacts 134 and 143 closed, brake solenoid 61 is once again energized, thereby pulling brake arm 60 from the path of wafers and allowing wafer feed once again to table 78.

With the new wafer feed to table 78, the air jet is again broken closing contact 140 and again energizing relay 141. This closes relay contact 144, and opens relay contacts 142, 143. Since contacts 136 and 143 are open, solenoid 61 becomes de-energized, and its spring biased plunger moves brake arm 60 against the wafers to stop their travel on conveyor 57. Also, with contact 142 open, valve solenoids 138, 139, become de-energized, again directing pressure flow to cylinder 118 so its plunger 119 moves to the right, as viewed in Figures 1, 11, and 12. This brings sweeper arm 89 into contact with the wafers which are delivered thereby to packaging station 91. Lever 85 thereupon engages switch 129, and closes its contacts 136, 137. And, with contacts 136, 144, closed, brake solenoid 61 is once again energized to remove brake arm 60 from the wafers on conveyor 57, and the sequence of operation thereupon is repeated.

When it is desired to use only one packaging station, the operation is as follows. First the selector switch is thrown to close contacts 132, 133, while opening contacts 130, 131. With pressure on lever 85 is engaged with limit switch 129 to close contacts 136, 137. As the wafers fed from conveyor 57 break the air jet and cause contact 140 to close, relay 141 is energized to close contact 142 and energize valve solenoid 138, 139. This directs the pressure flow to cylinder 118 so as to cause its plunger 119 to move to the left, as viewed in Figures 1, 11, and 12. As lever 85 correspondingly is moved from limit switch 129, contacts 136, 137, are opened and brake solenoid 61 is deenergized. This allows the spring biased brake solenoid plunger to actuate brake arm 60 and bar wafer travel with conveyor 57. In the meanwhile, sweeper arm 88 engages the wafers to move them to packaging station 90. This restores the air jet between nozzle 80 and opening 82, and allows pressure switch 84 to open its contact 140. At the completion of wafer packaging, lever 85 strikes limit switch 128, thereupon closing contacts 134, 135. With contact 134 closed, this completes electrical circuiting through selector switch contact 132 to immediately energize relay 141, which opens its contact 142 and de-energizes valve solenoids 138, 139. With valve solenoids de-energized, pressure is directed to air cylinder 118 to move plunger 119 to the right, thus returning the lever 85 and sweeper arm assembly to station 91. Lever 85 engages limit switch 129, closing contacts 136, 137, and energizing brake solenoid 61 to allow the wafers once again to be fed to table 78 and start a new cycle of packaging operation.

The above explained operations may be utilized to fill boxes with layers of aligned wafers, or may be run to fill shallow trays wherein only single layers of wafers are packaged. When plural layers of wafers are packaged in a box, it is understood, of course, that the box is not removed from its packaging position until it is entirely filled. Also, the herein disclosed apparatus may be used with automatic machinery for setting up and delivering the boxes to the packaging positions, and for removing the filled boxes from said positions, or it may be employed equally as well using operators at each of the packaging positions for delivering and removing the boxes to and from said positions. In any event, once the packaging operation is completed, the filled boxes are in condition to be delivered to still other automatic machinery for wrapping and sealing.

It is preferred that brake arm 60 have a soft rubber face in order that it may contact more than one wafer at a time, and thus assure that wafer flow to the packaging station is stopped effectively. Since the wafers are not all exactly the same size, the rubber facing compensates for any differences in wafer length which may exist. A rubber face also is preferred since coatings, such as chocolate, do not tend to build up as readily on such materials.

It is to be distinctly understood that the apparatus shown and described herein is a preferred embodiment which has been given by way of example only and that various changes and rearrangements of the details shown may be made without departing from the spirit of the invention, the scope of which is defined in the appended claims.

What is claimed is:

1. Conveying, alignment and packaging apparatus for relatively frangible articles of substantially uniform size, comprising: a first wide conveyor for receiving said articels delivered thereto arranged in spaced irregularly aligned squads; means for aligning the articles in each squad, including an arm extending substantially perpendicular to the flight of said first conveyor and positionable thereabove, a photoelectric cell assembly adjacent said arm and having a beam directed substantially parallel with said arm at such height that it is interruptable by said articles on said first conveyor, means connected with said arm and responsive to beam interruption whereby said arm is lowered into the path of article travel on said first conveyor to effect accurate alignment of articles in successive squads thereof; an intermediate speed-up conveyor adjacent to and aligned with said first conveyor for receiving and moving the aligned squads at a higher linear velocity, whereby the spacing between squads is increased; a narrow third conveyor, disposed substantially perpendicular to said first and said intermediate conveyors, and having its receiving end adjacent the discharge of said intermediate conveyor, whereby said squads are collected and said articles are carried in single line formation; guides along the third conveyor flight for maintaining said articles in single line-single tier formation; a table for intermittently receiving said articles in single line formation; a sweeper assembly for moving the articles from said table, in a direction transverse to article alignment on said table, and into an awaiting container; a fluid operated cylinder and piston assembly connected with said sweeper assembly to effect movement thereof; means for sensing said articles on said table; controls responsive to said latter means for supervising the selective movement of said sweeper assembly in alternate opposed directions; a movable gate disposed adjacent the discharge of said third conveyor; and means connected with said controls and said gate to effect closing thereof, thereby arresting advance of the articles to said table during sweeper assembly movement.

2. Conveying and handling apparatus for articles of relatively uniform size, comprising: a first wide endless conveyor for receiving said articles delivered thereto in spaced irregularly aligned squads; means for aligning the articles in each squad, including a horizontal bar extending perpendicular to the flight of said first conveyor and thereabove; an electric eye; a light source directing a beam across the passage of articles on said first conveyor, perpendicular to the flight thereof, and to said electric eye, a solenoid connected with said bar to control the position thereof and responsive to beam interruption whereby said bar is selectively positionable into the passage of said articles to effect accurate alignment articles in successive squads thereof; an intermediate speed-up conveyor adjacent to and aligned with said first conveyor for receiving and moving the aligned squads at a higher linear velocity, whereby the spacing between squads is increased; a narrow third conveyor, disposed perpendicular to said intermediate conveyor and adjacent thereto for receiving the successive squads and carrying the articles in single line formation towards final packaging; and guide means extending along and above said third conveyor to maintain said formation.

3. Apparatus for packaging comestibles of substantially uniform size, comprising: an endless conveyor; guide means including stationary side and upper rails in juxtaposition with said conveyor to maintain the comestibles thereon in single-line single-tier formation; a table adjacent the discharge of conveyor flight for receiving the aligned comestibles pushed thereon from said conveyor; a stop on said table for limiting comestible feed thereon; an air nozzle adjacent the front face of said stop for delivering a jet of air interruptable by the presence of a comestible adjacent said stop; a sweeper arm for moving predetermined amounts of said comestibles from said table, in a direction transverse to comestible alignment on said table, and into an awaiting package; a pneumatic cylinder and piston assembly for moving said arm; controls responsive to air jet interruption for actuating said cylinder and piston assembly and supervising the selective movement of said arm alternately in opposed directions; a movable gate disposed adjacent the conveyor discharge; and means connected with said controls and effective to close said gate and arrest comestible advance to said table during sweeper arm movement.

4. The apparatus of claim 3, and additionally including linkage holding said stop; a roller carried by said linkage; a pair of cam surfaces carried by said sweeper arm, said cam surfaces being alternately engageable with said roller when said sweeper arm is at its alternate extreme positions to maintain said stop in a foremost position whereat said stop is engaged by the leading comestible pushed onto said table; and means including a spring anchored to said table and acting on said stop to move the same to a rearmost position, thereby to relieve the pressure on said comestibles during sweeper arm movement.

5. Conveyor and packaging apparatus for frangible articles comprising: a narrow conveyor carrying articles of substantially uniform size in single line continuous formation; a table adjacent the discharge of said conveyor; a sweeper arm for moving predetermined amounts of said articles from said table, in a direction perpendicular to article alignment on said table, and into an awaiting package; a pneumatic operated cylinder and piston assembly connected with said sweeper arm; means including an air nozzle for delivering a jet of air interruptable by the presence of the articles on said table; and controls responsive to the interruption of said air jet for supervising the operation of said cylinder and piston assembly.

6. An apparatus for packaging relatively frangible articles of substantially uniform size, comprising: a table for receiving said articles thereon in single line formation; a sweeper assembly for moving predetermined amounts of said articles from said table in a direction transverse to article alignment, and into packaging position; a pneumatic operated cylinder and piston assembly connected with said sweeper assembly to effect movement thereof; means including an air nozzle for delivering a jet of air interruptable by the presence of articles on said table; controls responsive to the interruption of said air jet for supervising the selective operation of said cylinder and piston assembly; a movable gate adjacent the entrance to said table; and means connected with said controls and said gate to effect gate closing and arrest of article feed to said table during sweeper assembly movement.

7. The packaging apparatus of claim 6 wherein said sweeper assembly is movable alternately to opposed packaging positions, said controls including a solenoid valve, a pair of lines connected thereto for delivering compressed air to either end of the air cylinder, circuit means including limit switches controllable by said sweeper arm according to the last preceding sweeper movement towards one of said opposed positions whereby said valve is energized to admit air to said cylinder and drive said sweeper arm to the other of said opposed positions.

8. Conveying and packaging apparatus for relatively frangible articles of substantially uniform size, comprising: a narrow conveyor; guide means including stationary side and upper rails in juxtaposition with said conveyor to maintain the articles thereon in single-line single-tier formation; a table adjacent the end of conveyor flight; a sweeper assembly for moving predetermined amounts of said articles from said table, in a direction transverse to article alignment, and into packaging position; a pneumatic operated cylinder and piston assembly connected with said sweeper assembly to effect movement thereof; means for sensing said articles on said table; controls responsive to said latter means for supervising the selective operation of said cylinder and piston assembly; a movable gate disposed adjacent the discharge of said conveyor; and means connected with said controls and said gate to effect closing thereof and arrest advance of the articles to said table during sweeper assembly movement.

9. In combination, a conveyor carrying spaced rows of irregularly aligned articles thereon, and means for aligning said articles in rows substantially perpendicular to conveyor flight, comprising a member disposed substantially perpendicular to the conveyor flight and thereabove, a photoelectric assembly adjacent said member, including an electric eye and a light source directing a beam across said conveyor and the passage of said articles thereon, towards said light source, and in a direction parallel with said member, a solenoid connected with said member to control the position thereof and responsive to beam interception by said articles whereby said member is selectively positionable into the passage of said articles to retard the same until all in a row are accurately aligned, and stops limiting the position of said member.

10. Apparatus for packaging frangibles of substantially uniform size, comprising: an endless conveyor carrying said frangibles thereon in continuous single line formation, a stationary table adjacent the end of conveyor flight for receiving the frangibles fed from said conveyor; a stop for limiting frangible feed on said table; an air nozzle in juxtaposition with said stop for delivering a jet of air interruptable by the presence of a frangible against said stop; a sweeper assembly including an arm for moving predetermined amounts of said frangibles on the table, in a direction transverse to frangible alignment thereon; and into an awaiting package; means for driving said arm; and controls responsive to air jet interruption for actuating said driving means.

11. The apparatus of claim 10 and additionally including conveyor and handling equipment whereby said frangibles are delivered to said endless conveyor in single line formation, said equipment comprising a second relatively wide endless conveyor delivering said frangibles thereon in spaced irregularly aligned squads; a bar disposed substantially perpendicular to the flight of said second conveyor and parallel with said first conveyor; a photoelectric assembly adjacent said arm and directing a beam across said second conveyor and the passage of said frangibles thereon, and parallel with said bar; a solenoid connected with said bar to control the position thereof, said solenoid being responsive to beam interception by the frangibles in each of said passing irregularly aligned squads to position said bar into the path of each of successive squads to retard the same until all frangibles in a respective squad are accurately aligned in a row parallel with the flight of said first conveyor; a speed-up conveyor adjacent the discharge of said second conveyor, having a flight parallel therewith and perpendicular to said first conveyor, the discharge of said speed-up conveyor being adjacent the flight of first conveyor, whereby the successively accurately aligned rows are delivered thereto and form a single line of frangibles thereon.

12. The apparatus of claim 10, and additionally including a movable gate adjacent the discharge of said first conveyor, and actuating means connected with said controls and effective to close said gate and arrest frangible advance to said table during sweeper arm movement.

13. The apparatus of claim 12 and additionally including guides along and above the flight of said first conveyor, whereby said frangibles are maintained thereon at all times in single line-single tier formation.

14. The apparatus of claim 10 wherein said stop is movable slightly, said apparatus additionally including a link connected with said stop; a cam surface carried by said link; a second cam surface carried by said sweeper arm, and engageable with said first cam surface when said sweeper arm is at rest to hold said stop in a foremost position; and means including a spring biasable on said stop to move said stop to a rearmost position, thereby to relieve the pressure between the frangibles on said table during sweeper arm movement.

15. The apparatus of claim 10 wherein said sweeper arm is movable alternately to packaging positions at opposed locations relative to said table, said controls including alternate circuits for said driving means according toward which packaging position said arm is to move, means including two contactors controlled alternatively according to the rest position of said sweeper assembly and arm at said packaging positions for actuating that circuit of said drive means to move said arm in a direction opposite to its last direction of movement.

16. The apparatus of claim 10 wherein said controls include an air switch responsive to air jet interruption, and said driving means includes a pneumatic cylinder and piston assembly connected with said arm, air lines connected at each end of the cylinder, and a valve connected with said air switch for delivering compressed air alternately to said lines, whereby said assembly moves said arm alternately in opposed directions.

17. Conveying and packaging apparatus for relatively frangible articles of substantially uniform size, comprising: a conveyor; a table adjacent the end of conveyor flight; a sweeper assembly including an arm for moving predetermined amounts of said articles from said table, in a direction transverse to article alignment, and into packaging position; drive means connected with said assembly to effect movement thereof; means for sensing the articles on said table; controls responsive to said latter means for supervising the selective operation of said drive means; a movable gate disposed adjacent the discharge of said conveyor; and means connected with said controls and said gate to effect closing thereof and arrest advance of said articles to said table during sweeper assembly movement.

No references cited.